US012749878B2

(12) United States Patent
Nakao

(10) Patent No.: US 12,749,878 B2
(45) Date of Patent: Sep. 29, 2026

(54) CABLE PROTECTION MEMBER AND AIRCRAFT LAVATORY UNIT EQUIPPED WITH SAID CABLE PROTECTION MEMBER

(71) Applicant: The Yokohama Rubber Co., LTD., Kanagawa (JP)

(72) Inventor: Kazushi Nakao, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 85 days.

(21) Appl. No.: 18/698,623

(22) PCT Filed: Jul. 27, 2022

(86) PCT No.: PCT/JP2022/028874
§ 371 (c)(1),
(2) Date: Apr. 4, 2024

(87) PCT Pub. No.: WO2023/062912
PCT Pub. Date: Apr. 20, 2023

(65) Prior Publication Data
US 2024/0405530 A1 Dec. 5, 2024

(30) Foreign Application Priority Data
Oct. 12, 2021 (JP) ................................ 2021-167593

(51) Int. Cl.
*H02G 3/04* (2006.01)
*B64D 11/02* (2006.01)
*E03C 1/05* (2006.01)

(52) U.S. Cl.
CPC .......... *H02G 3/0406* (2013.01); *B64D 11/02* (2013.01); *E03C 1/057* (2013.01)

(58) Field of Classification Search
None
See application file for complete search history.

(56) References Cited

U.S. PATENT DOCUMENTS 3,836,269 A * 9/1974 Koscik .................... F16J 15/02 403/197
4,849,723 A * 7/1989 Oliver, Jr. ........... G02B 6/4277 333/248
5,462,312 A * 10/1995 Carpenter ................ F16L 7/00 285/31
5,509,814 A * 4/1996 Mosquera ............. H01R 12/58 439/82
(Continued)

FOREIGN PATENT DOCUMENTS

DE 102015208400 A1 11/2016
JP 2000224740 A 8/2000
(Continued)

*Primary Examiner* — Krystal Robinson
(74) *Attorney, Agent, or Firm* — Thorpe North & Western

(57) ABSTRACT

A cable protection member includes a cable insertion hole through which a cable is inserted and a pair of protection member sections divided in a diameter direction of the cable insertion hole. The pair of protection member sections include diameter-direction coupling portions to be immovably coupled to each other in the diameter direction of the cable insertion hole with the pair of protection member sections coupled to each other.

6 Claims, 19 Drawing Sheets

(56) References Cited

U.S. PATENT DOCUMENTS

| | | | | | |
|---|---|---|---|---|---|
| 5,800,183 | A * | 9/1998 | Paul | H01R 33/09 | |
| | | | | 439/558 | |
| 8,178,795 | B2 * | 5/2012 | Roy | H02G 3/185 | |
| | | | | 174/68.3 | |
| 8,586,865 | B2 * | 11/2013 | Power | A61B 1/00154 | |
| | | | | 174/68.3 | |
| 9,054,450 | B2 * | 6/2015 | Nagasaki | H01R 12/7029 | |
| 11,690,165 | B2 * | 6/2023 | Hill | H05K 1/0204 | |
| | | | | 361/772 | |
| 2010/0307817 | A1 * | 12/2010 | Roy | H02G 3/185 | |
| | | | | 174/666 | |
| 2018/0138681 | A1 | 5/2018 | Maumann et al. | | |

FOREIGN PATENT DOCUMENTS

| | | | |
|---|---|---|---|
| JP | 2009-185507 | A | 8/2009 |
| JP | 2016-126 | A | 1/2016 |
| JP | 2016-086600 | A | 5/2016 |
| JP | 5986142 | B2 | 9/2016 |

* cited by examiner

FIG. 9A
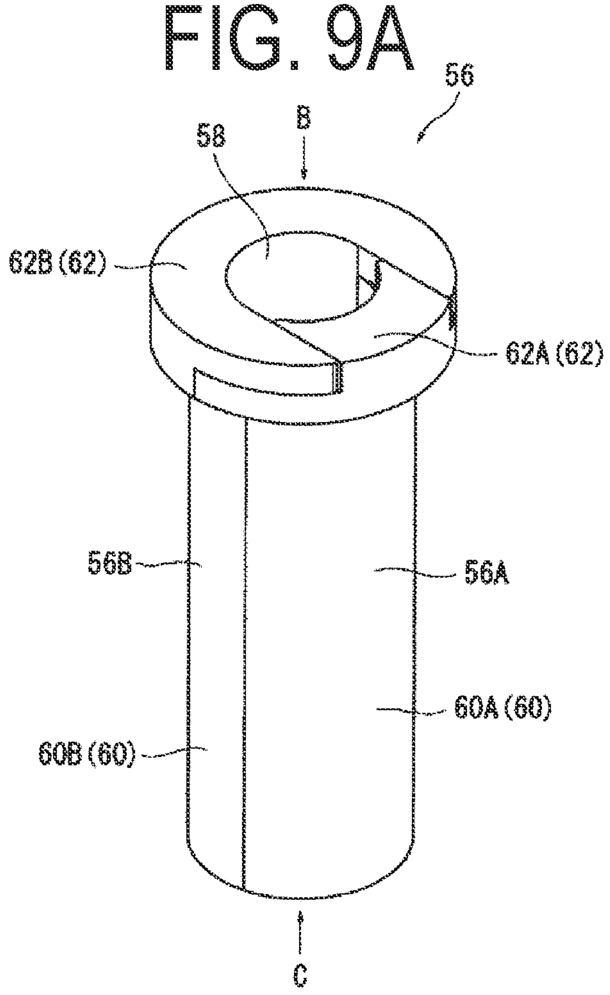
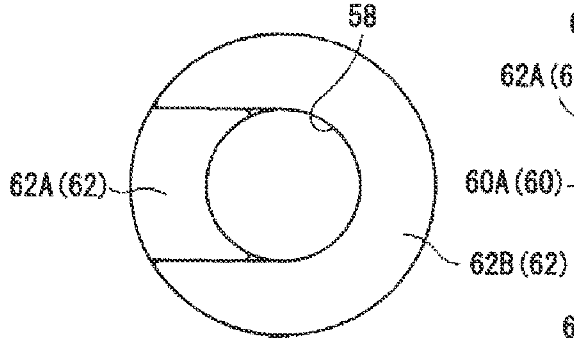
FIG. 9B
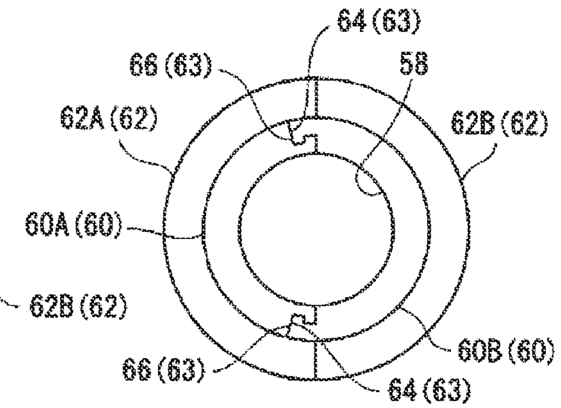
FIG. 9C

FIG. 11A
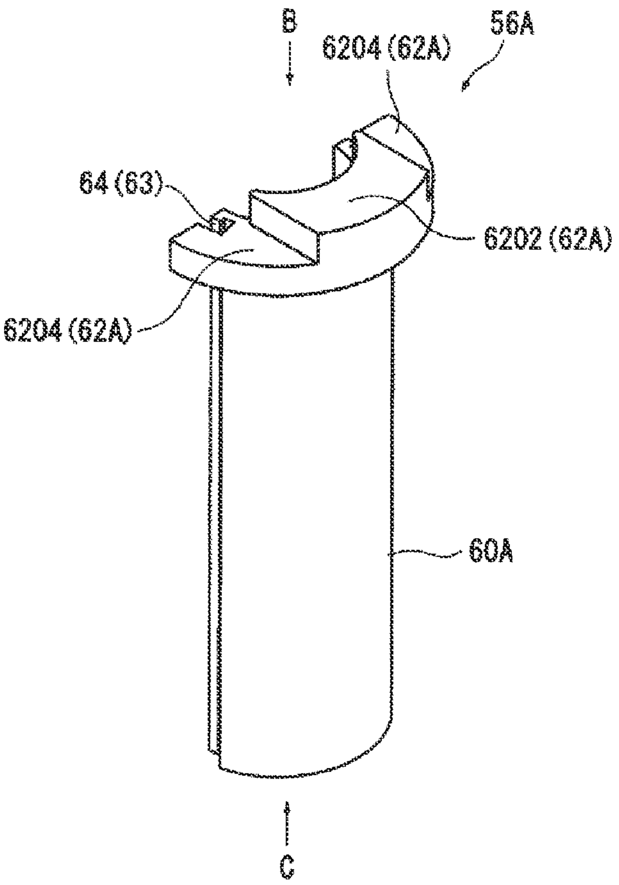
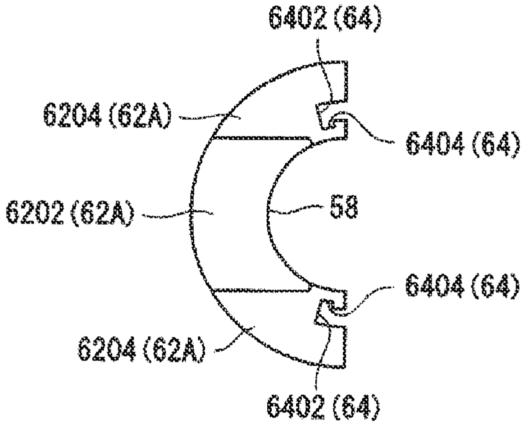
FIG. 11B
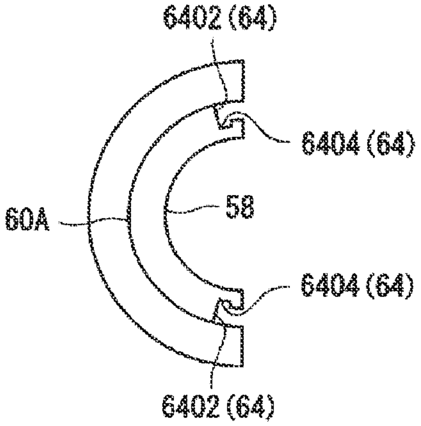
FIG. 11C

FIG. 13A
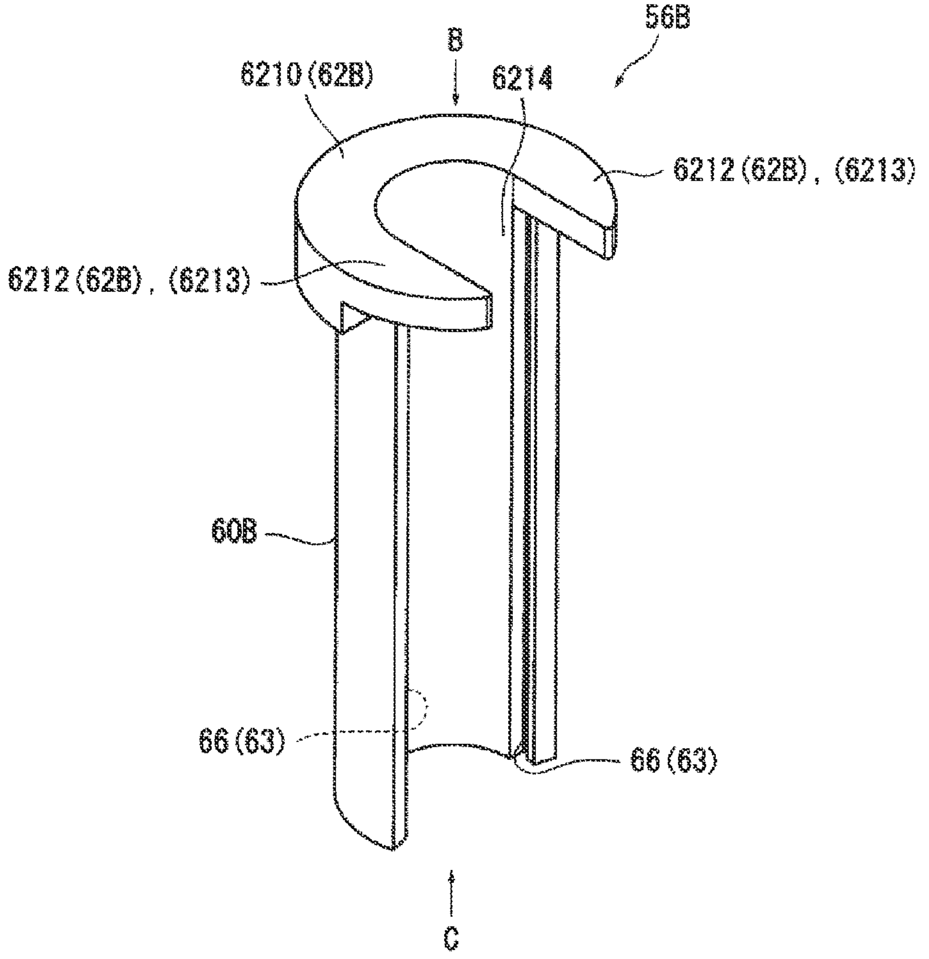
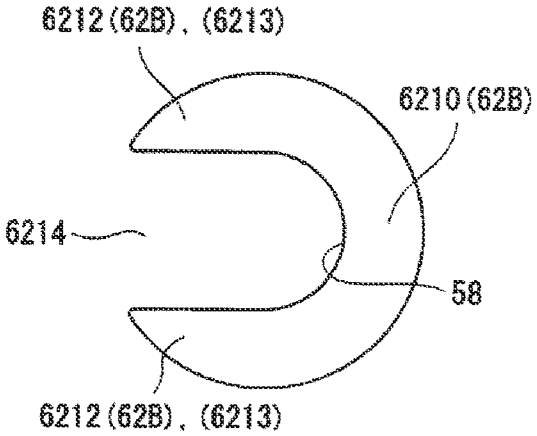
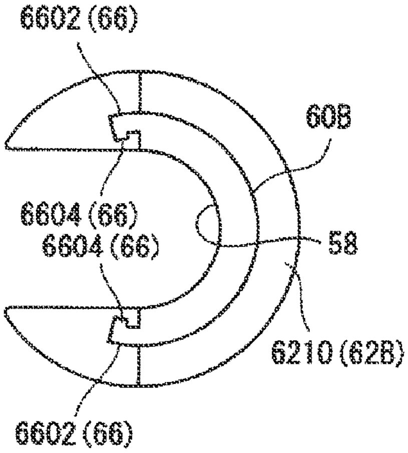
FIG. 13B FIG. 13C

CABLE PROTECTION MEMBER AND AIRCRAFT LAVATORY UNIT EQUIPPED WITH SAID CABLE PROTECTION MEMBER

TECHNICAL FIELD

The present technology relates to a cable protection member and an aircraft lavatory unit equipped with the cable protection member.

BACKGROUND ART

In wiring a cable that connects electrical devices installed on-site, a tube-shaped cable protection member that covers and protects the cable not to damage the cable by touching a surrounding structure around which the cable is routed has been proposed (see Japan Unexamined Patent Publication No. 2016-86600 A).

Such a cable protection member covers the cable, with the cable inserted into the inside of the cable protection member.

In protecting a cable having one end connected to an electrical device and the other end attached with a connector by using the cable protection member described above, the outer diameter of the connector is larger than the inner diameter of the cable protection member in many cases, thus failing to insert the cable into the cable protection member due to obstruction of the connector.

Thus, in such a case, it is necessary to once detach the connector from the cable and insert the cable into the cable protection member and then reattach the connector to a portion of the cable exposed from an end portion of the cable protection member. That is, detachment and attachment work of the connector is needed, which is disadvantageous in efficient cable protection work on-site.

In a lavatory unit for aircraft, for example, a faucet installed on the upper surface of a counter table of a lavatory and equipped with a sensor detecting part of a human body and a control unit which is installed below the counter table and controls water discharge and water stop of the faucet in response to a detection signal of the sensor may be connected by a cable having one end of the cable connected to the faucet side and the other end of the cable attached to a connector.

In protecting the cable with the above-described cable protection member, the outer diameter of the connector is larger than the inner diameter of the cable protection member as described above. This needs detachment and attachment work of the connector and is disadvantageous in efficient cable protection work on-site.

Meanwhile, in a lavatory unit for aircraft, a faucet is attached via a through-hole formed in a counter table, and a cable is connected to a control unit located below the counter table through the through-hole.

A section around the through-hole at the lower surface of the counter table is an edge, and the cable is disposed passing near the edge.

Thus, severe vibration of a fuselage when an aircraft enters an air pocket during flight may cause the cable to contact the edge and damage a covered portion of the cable. When the covered portion is damaged, maintenance work at the time of maintenance, such as replacement of the cable, becomes troublesome, and thus any improvement has been awaited.

SUMMARY

The present technology provides a cable protection member that is advantageous in improving efficiency of cable protection work and an aircraft lavatory unit including the cable protection member that is advantageous in improving efficiency of protection work of a cable to be used in the aircraft lavatory unit and in protecting the cable.

An embodiment of the present technology is a cable protection member for protecting a cable. The cable protection member includes a cable insertion hole through which the cable is inserted and a pair of protection member sections divisible in a diameter direction of the cable insertion hole. The pair of protection member sections include diameter-direction coupling portions to be immovably coupled in a direction away from each other in the diameter direction of the cable insertion hole, and the cable insertion hole is formed inside the pair of protection member sections that are being coupled via the diameter-direction coupling portions.

According to the embodiment of the present technology, without detaching the connector from the cable, the cable can be inserted through the cable insertion hole and covered with the cable protection member by coupling the pair of protection member sections with the cable sandwiched therebetween with the diameter-direction coupling portions, allowing the cable to be easily and reliably covered and protected by the cable protection member. This is advantageous in improving efficiency of cable protection work and in simplifying maintenance work.

BRIEF DESCRIPTION OF DRAWINGS

FIGS. 9A-9C illustrate assembly diagrams of the cable protection member according to the embodiment, wherein FIG. 9A is a perspective view, FIG. 9B is a view in the direction of an arrow B in FIG. 9A, and FIG. 9C is a view in the direction of an arrow C in in FIG. 9A.

FIGS. 10A-10C illustrate assembly diagrams of the cable protection member according to the embodiment, wherein FIG. 10A is a front view. FIG. 10B is a view in the direction of an arrow B in FIG. 10A, and FIG. 10C is a view in the direction of an arrow C in FIG. 10A.

In FIGS. 11A-11C, FIG. 11A is a perspective view of a first protection member section. FIG. 11B is a view in the direction of an arrow B in FIG. 11A, and FIG. 11C is a view in the direction of an arrow C in FIG. 11A.

In FIGS. 12A-12C.

In FIGS. 13A-13C, FIG. 13A is a perspective view of a second protection member section, FIG. 13B is a view in the direction of an arrow B in FIG. 13A, and FIG. 13C is a view in the direction of an arrow C in FIG. 13A.

In FIGS. 14A-14C.

In FIGS. 16A-16B.

In FIGS. 17A-17B.

In FIGS. 18A-18B.

In FIGS. 19A-19B.

DETAILED DESCRIPTION

First Embodiment

Next, the present embodiment will be described with reference to the drawings.

In the present embodiment, a case in which a cable protection member according to an embodiment of the present technology is applied to an automatic faucet constituting a counter table device of an aircraft lavatory unit will be described.

First, an aircraft lavatory unit will be described.

Figure 1:
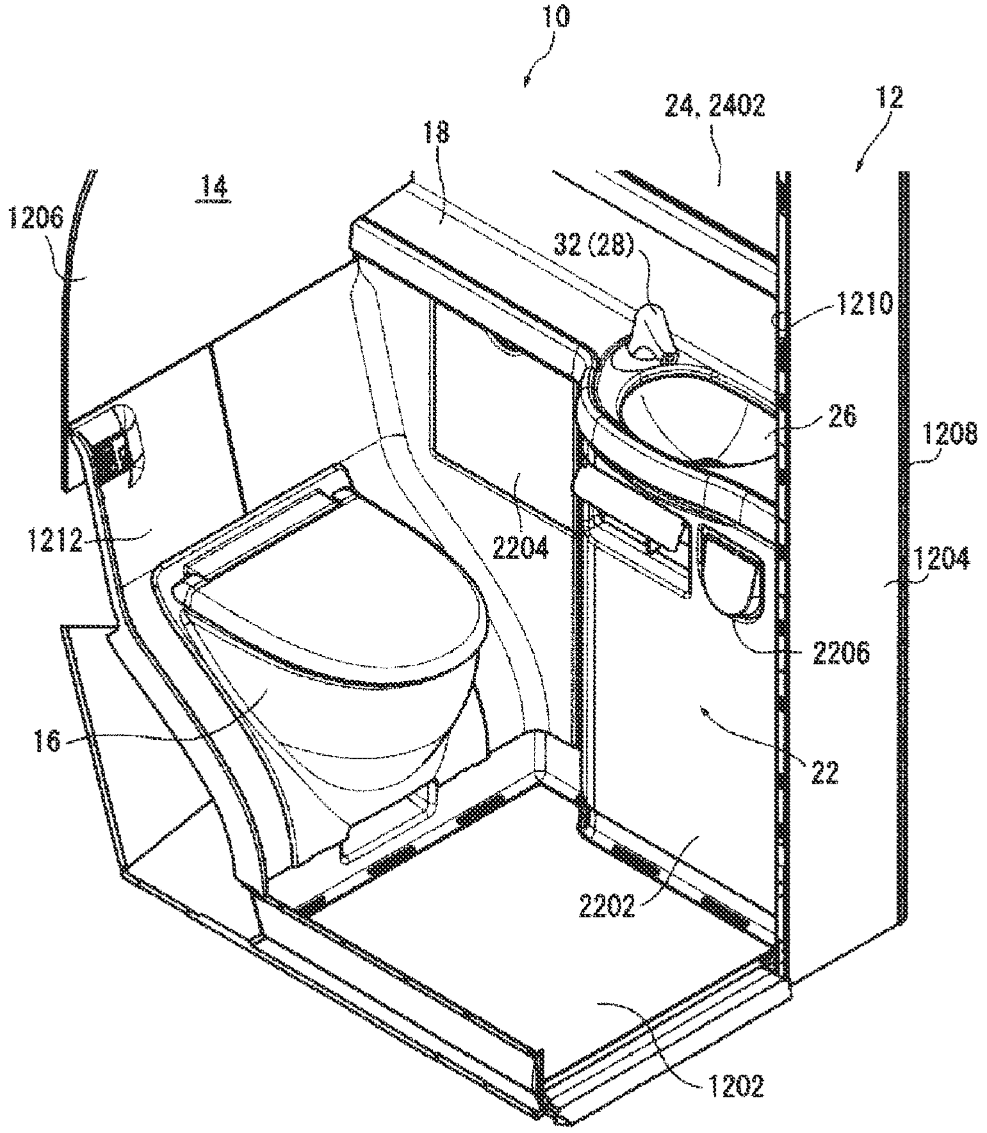
FIG. 1 is a perspective view of an aircraft lavatory unit to which a cable protection member according to an embodiment is applied.

As illustrated in FIG. 1, an aircraft lavatory unit 10 includes a structural frame 12 including a bottom wall 1202, a plurality of wall plates rising from the bottom wall 1202, and a ceiling (not illustrated) that form a lavatory 14 therein.

In the present embodiment, one of the plurality of wall plates is a front wall 1204, one is a rear wall 1206 facing the front wall 1204, and the remaining two walls are a pair of side walls 1208 that connect two sides of the rear wall 1206 and corresponding two sides of the front wall 1204, an entrance 1210 opened and closed by a door is provided at the front wall 1204, an inner wall 1212 is provided in front of the rear wall 1206, and a toilet 16 is provided on the bottom wall 1202 via the inner wall 1212.

In FIG. 1, one of the pair of side walls 1208, and the door that opens and closes the entrance 1210 are omitted.

A counter table 18 is provided in the middle of the side wall 1208 in the height direction. Below the counter table 18 is a lower storage portion 22 in which, for example, a trash can device having a fire extinguishing function (not illustrated) and equipment for the lavatory 14 are stored. The lower storage portion 22 is openable and closable by a plurality of doors 2202 and 2204. In FIG. 1, the reference sign 2206 indicates a trash feeding port.

Above the counter table 18 is an upper storage portion 24 in which equipment for the lavatory 14, such as tissues, is stored. The upper storage portion 24 is opened and closed by a mirrored door 2402.

A bowl portion 26 is provided at a section of the counter table 18 close to the front wall 1204, and an automatic faucet 28 that can discharge water to the bowl portion 26 is provided at a section of the counter table 18 around the bowl portion 26.

Figure 3:
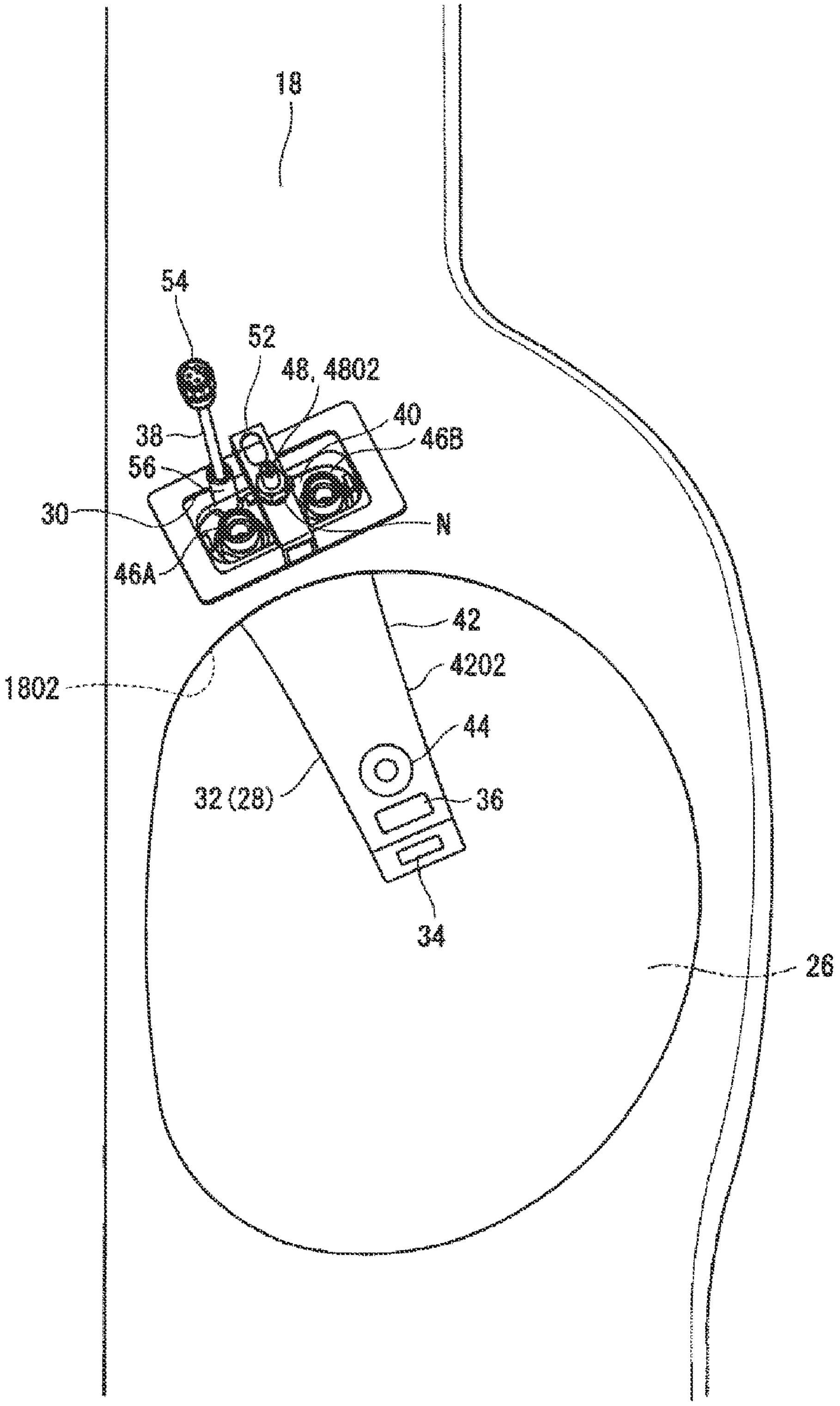
FIG. 3 is a bottom view of FIG. 2 as viewed from below the counter table, illustrating a state in which the cable protection member according to the embodiment is installed at a cable.

As illustrated in FIG. 3, the automatic faucet 28 is disposed via a through-hole 30 provided in the counter table 18.

Figure 6A:
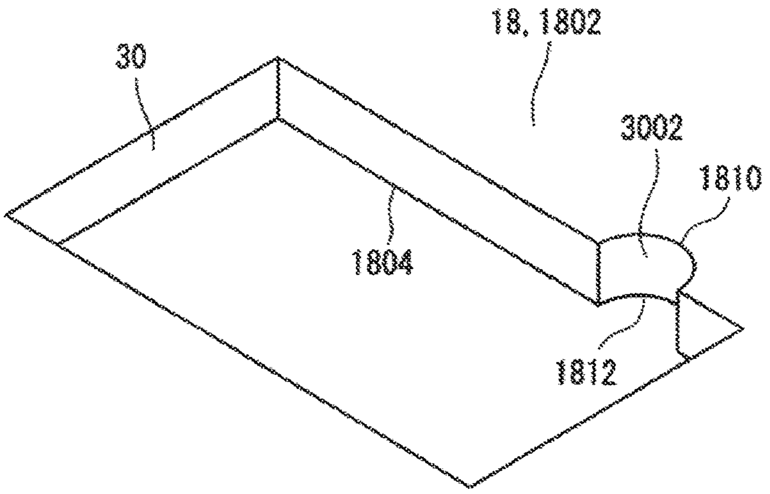
FIGS. 6A, 6B and 6C are explanatory diagrams illustrating a state in which the cable protection member according to the embodiment is installed at a notch portion of the counter table.

As illustrated in FIG. 6A, edges 1810 and 1812 remain around the through-hole 30 and a notch portion 3002 at an upper surface 1802 and a lower surface 1804 of the counter table 18.

The automatic faucet 28 detects part of a human body (fingers) to discharge and stop water.

As illustrated in FIGS. 2 to 5, the automatic faucet 28 includes a faucet 32, a contact sensor 34, a non-contact sensor 36, a control unit (not illustrated), and a cable 38.

Figure 2:
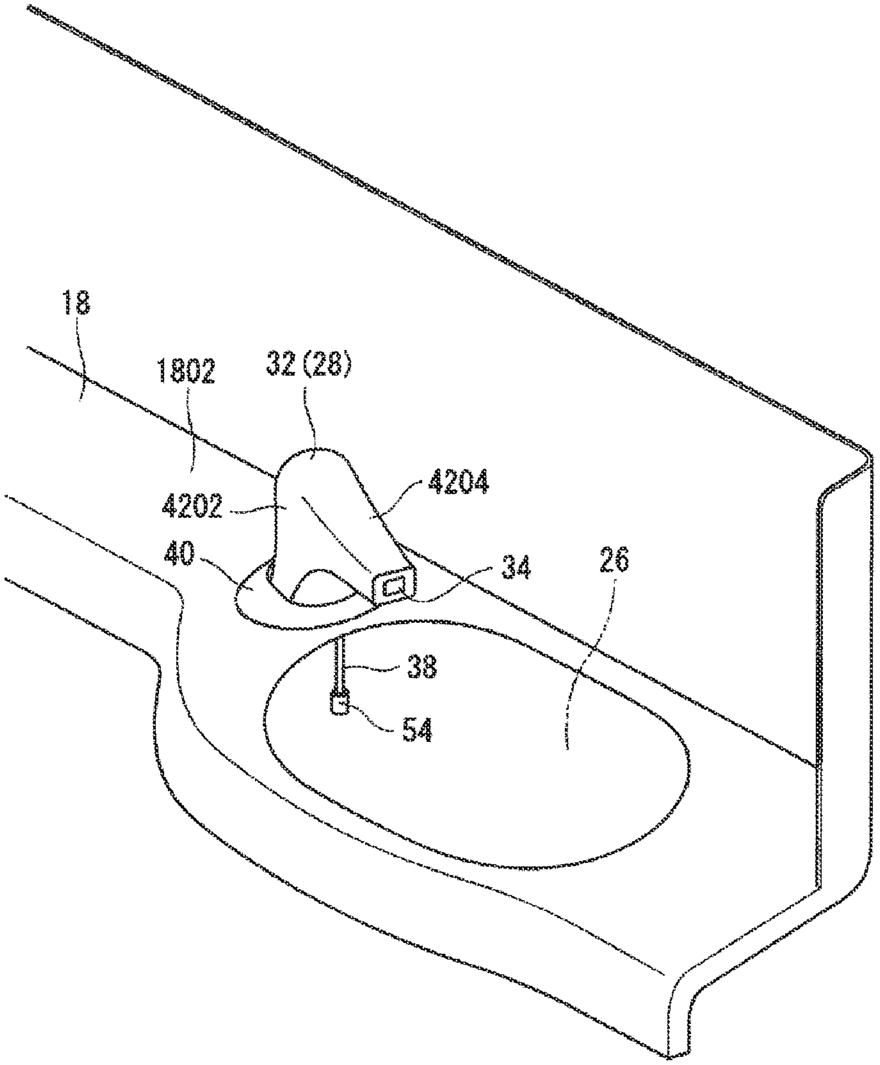
FIG. 2 is an enlarged perspective view of a portion of a counter table to which an automatic faucet is attached.

The bowl portion 26 is not illustrated in FIGS. 2 and 3.

The faucet 32 discharges water supplied from a water supply source (not illustrated) via a water supply path (not illustrated) and hot water supplied from a water heater (not illustrated) provided at the water supply path via a hot water path (not illustrated).

The faucet 32 is made of various known materials such as metal and synthetic resin.

As illustrated in FIGS. 2 to 5, the faucet 32 includes a base plate portion attached to the upper surface 1802 of the counter table 18, and a faucet body 42 standing from the base plate portion 40 and including a water discharge port 44 at a tip portion thereof.

The shape of the faucet body 42 is appropriately modified according to a section at which the faucet 32 is installed. In the present embodiment, as illustrated in FIGS. 2 and 4, the faucet body 42 includes a vertical portion 4202 standing upward from the base plate portion 40 and a horizontal portion 4204 extending from the upper part of the vertical portion 4202 toward the bowl portion 26.

Figure 4:
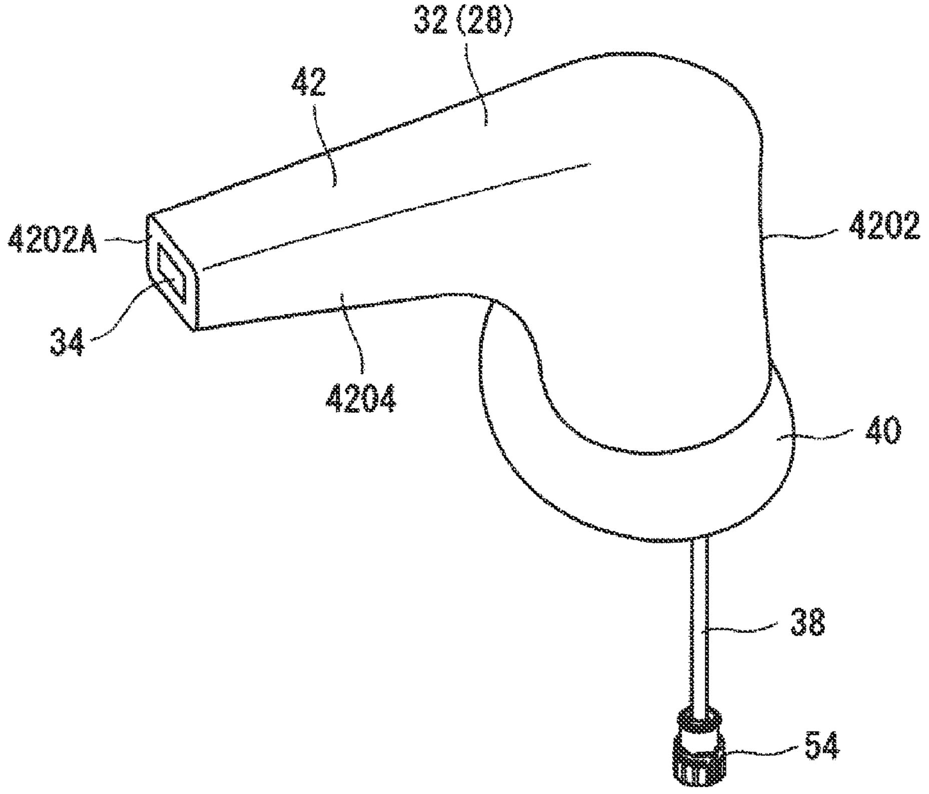
FIG. 4 is a perspective view of the automatic faucet as viewed obliquely from above.
Figure 5:
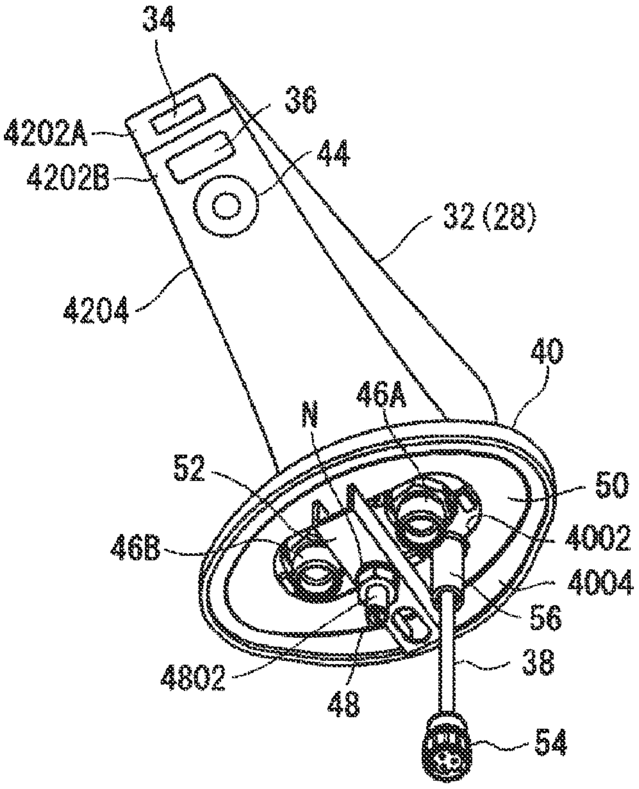
FIG. 5 is a perspective view of the automatic faucet as viewed obliquely from below, illustrating a state in which the cable protection member according to the embodiment is provided at the cable of the automatic faucet.

As illustrated in FIGS. 4 and 5, the contact sensor 34 is provided at a front surface 4202A of the horizontal portion 4204 of the faucet body 42 around the water discharge port 44 and detects part of a human body when the part of the human body comes into contact with the contact sensor 34.

Such a contact sensor 34 can use a known sensor such as a touch switch that detects finger contact or a capacitive touch sensor that detects part of a human body with a change in electrostatic capacitance due to finger contact. In the present embodiment, a touch switch is used as the contact sensor 34.

As illustrated in FIG. 5, the non-contact sensor 36 is provided at a lower surface 4204B of the horizontal portion 4204 of the faucet body 42 around the water discharge port 44 and detects part of a human body in a non-contact manner.

The lower surface 4204B of the horizontal portion 4204 faces obliquely downward facing the upper side of the bowl portion 26.

Such a non-contact sensor 36 can use a known sensor such as an infrared sensor that radiates detection light composed of infrared rays to detect part of the human body in response to reflected light or a capacitive non-contact sensor 36 that detects part of a human body in a non-contact manner with a change in electrostatic capacitance due to the approach of the part of the human body. The present embodiment uses an infrared sensor as the non-contact sensor 36.

As illustrated in FIGS. 4 and 5, the base plate portion 40 has an elliptical shape in a plan view.

As illustrated in FIG. 5, an opening 4002 communicating with the interior of the faucet body 42 is provided at the center of a lower surface 4004 of the base plate portion 40, and a pair of connecting pipe portions 46A and 46B connected to the water discharge port 44 is provided on both sides of the opening 4002.

One connecting pipe portion 46A is a connecting pipe portion for water supply to which the water supply path is connected, and the other connecting pipe portion 46B is a connecting pipe portion for hot water to which the hot water path is connected.

A rod 48 attached to the faucet body 42 is suspended from the center of the opening 4002, and a male thread 4802 is formed at the lower portion of the rod 48.

At the lower surface 4004 of the base plate portion 40 located around the opening 4002, a packing 50 for preventing water leakage having an elliptical annular plate shape is disposed surrounding the pair of connecting pipe portions 46A and 46B and the rod 48.

As illustrated in FIG. 3, the base plate portion 40 of the faucet 32 is attached to the upper surface 1802 of the counter table 18 via the rod 48, a clamp fitting 52 having an elongated shape and a nut N engaged with the male thread 4802.

The base plate portion 40 of the faucet 32 is attached to the counter table 18 as follows.

The counter table 18 is provided with a through-hole 30 having an elongated shape which is slightly smaller than the contour of the base plate portion 40.

The lower surface 4004 of the base plate portion 40 is placed on the upper surface 1802 of the counter table 18 around the through-hole 30 with the packing 50 mounted at the lower surface 4004 of the base plate portion 40, and the base plate portion 40 is positioned to make the major axis direction of the base plate portion 40 parallel to the long side direction of the through-hole 30 and coincide the center of the base plate portion 40 with the center of the through-hole 30.

Next, the tip of the rod 48 projecting downward from the through-hole is inserted into the clamp fitting 52, both ends of the clamp fitting 52 in the longitudinal direction are brought into contact with the edge portions of a pair of long sides of the through-hole 30, the nut N is screwed onto the male thread 4802 of the rod 48 to tighten the clamp fitting 52 by the nut N, and thus the counter table 18 is sandwiched between the base plate portion 40 and the packing 50, and the clamp fitting 52. This allows the faucet 32 to be attached to the upper surface 1802 of the counter table 18.

The control unit is provided at a section below the counter table 18 in the vicinity of the automatic faucet 28, and is connected to the contact sensor 34 and the non-contact sensor 36 via the cable 38.

The control unit switches between water discharge and water stop from the water discharge port 44 based on detection signals output from the contact sensor 34 and the non-contact sensor 36.

In the present embodiment, a solenoid valve (not illustrated) is provided at each of the water supply path that supplies water to the faucet 32 and the hot water path that supplies hot water to the faucet 32. Upon receiving a detection signal indicating that the contact sensor 34 or the non-contact sensor 36 has detected part of a human body, the control unit opens the solenoid valve for a predetermined valve opening time to discharge water or hot water from the water discharge port 44, and closes the solenoid valve upon elapse of the valve opening time.

In this way, a predetermined amount of water or hot water is discharged from the faucet 32 by opening the valve for a certain valve opening time.

A selector switch (not illustrated) is connected to the control unit, and the control unit selects whether to supply water or hot water to the faucet 32 based on the operation of the selector switch to operate the electromagnetic valve.

The cable 38 connects the contact sensor 34 and the non-contact sensor 36 to the control unit. As illustrated in FIGS. 2 to 5, the cable 38 is drawn from the inside of the faucet body 42 to below the counter table 18 through the opening 4002 and the through-hole 30.

The cable 38 includes a plurality of electric wires connected to the contact sensor 34 and a plurality of electric wires connected to the non-contact sensor 36. The other ends of the plurality of electric wires are coupled to a single connector 54 and are detachably connected to the control unit via the connector 54.

In the present embodiment, the connector 54 connected to the cable 38 has an outer diameter larger than the inner diameter of a cable insertion hole 58 to be described below.

Instead of providing the single connector 54, a connector having an outer diameter larger than the inner diameter of the cable insertion hole 58 may be connected to each electric wire.

Each electric wire includes a core wire that is made of a conductor and transmits a signal, and a covering (core wire covering) that is made of an insulator and covers the core wire.

FIGS. 2 to 5 illustrate a case in which the cable 38 is a single cable 38 including a plurality of electric wires and a sheath (exterior covering) that is made of an insulator and collectively covers the plurality of electric wires.

Figure 15:
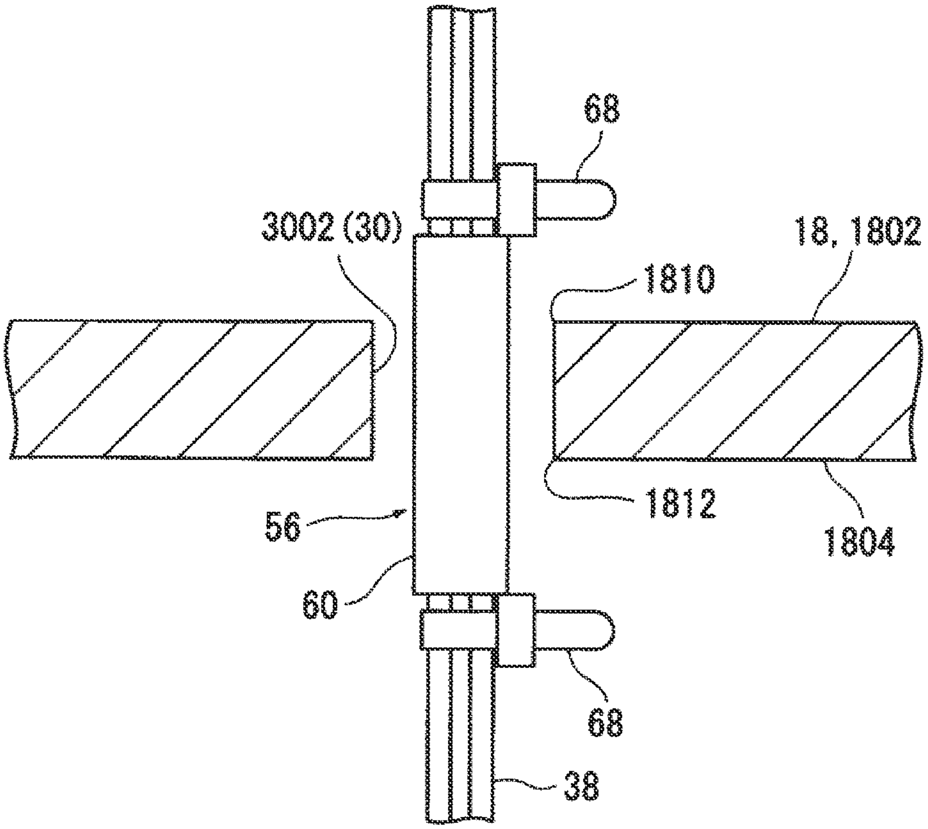
FIG. 15 is an explanatory diagram illustrating a state in which the cable protection member is supported by bundling bands fastened to cables.

The number of cables 38 is appropriately changed in accordance with the number of sensors provided at the automatic faucet 28. FIGS. 6A-6C and 8A-8C illustrate a case in which two cables 38 are used, and FIGS. 7 and 15 illustrate a case in which three cables 38 are used. As the cable 38 including a plurality of electric wires, any cables 38 having various known configurations can be used.

As illustrated in FIGS. 3, 6A-6C, and 7, the cable 38 extends downward from the vicinity of the connecting pipe portion 46A for water supply at the lower surface 4004 of the base plate portion 40 through the notch portion 3002 having an arcuate shape provided at a section closer to one side in the longitudinal direction of one long side of the through-hole 30 of the counter table 18.

The cable protection member 56 according to the present embodiment is disposed in the through-hole 30 and the notch portion 3002 to protect the cable 38 from the edges 1810 and 1812.

As illustrated in FIGS. 8A-8C and 9A-9C, the cable protection member 56 includes the cable insertion hole 58 through which the cable 38 is inserted, and is comprised of a pair of protection member sections 56A and 56B which can be divided into a first protection member section 56A and a second protection member section 56B having an elongated shape in a diameter direction of the cable insertion hole 58.

The pair of protection member sections 56A and 56B includes diameter-direction coupling portions 63 to be immovably coupled in a direction away from each other in the diameter direction of the cable insertion hole 58 and forms therein the cable insertion hole 58 with the pair of protection member sections 56A and 56B coupled via the diameter-direction coupling portions 63.

As illustrated in FIG. 9A-9C, in the present embodiment, the cable protection member 56 includes a cylindrical portion 60 that includes the cable insertion hole 58 and has a uniform outer diameter, and a flange portion 62 which is provided at an end portion of the cylindrical portion 60 in the longitudinal direction, which has an outer diameter larger than the outer diameter of the cylindrical portion 60, and through which the cable insertion hole 58 extends.

The pair of protection member sections 56A and 56B respectively include cylindrical half-body portions 60A and 60B that form the cylindrical portion 60 in a state of being coupled via the diameter-direction coupling portions 63, and flange half-body portions 62A and 62B which are provided at end portions of the cylindrical half-body portions 60A and 60B in the longitudinal direction and which form the flange portion 62 in a state of being coupled to each other.

The first protection member section 56A and the second protection member section 56B constituting the cable protection member 56 are made of an insulating synthetic resin.

As illustrated in FIGS. 11A-11C and 12A-12C, the cylindrical half-body portion 60A of the first protection member section 56A is formed in an elongated shape having a semicircular arc cross-section, and the inner circumferential surface thereof constitutes a half portion of the cable insertion hole 58.

As illustrated in FIG. 9C, the diameter-direction coupling portion 63 includes a locking groove 64 provided at one of the first protection member section 56A and the second protection member section 56B and a locking projection 66 which is provided at the other of the first protection member section 56A and the second protection member section 56B and can be locked with the locking groove 64.

As illustrated in FIGS. 11A-11C and 12A-12C, in the present embodiment, the locking groove 64 is provided on both sides of the cylindrical half-body portion 60A in the circumferential direction and extends over substantially the entire length of the cylindrical half-body portion 60A in the longitudinal direction.

As illustrated in FIGS. 11B and 11C, the locking groove 64 includes a circumferential groove 6402 extending in the circumferential direction of the cylindrical half-body portion 60A and a radial groove 6404 extending from an end portion of the circumferential groove 6402 toward an inner side in the radial direction of the cylindrical half-body portion 60A.

As illustrated in FIG. 11B, the flange half-body portion 62A of the first protection member section 56A has a semi-annular plate-like shape in a plan view.

The inner circumferential surface of the flange half-body portion 62A is continuous with the inner circumferential surface of the cylindrical half-body portion 60A.

Figure 12A:
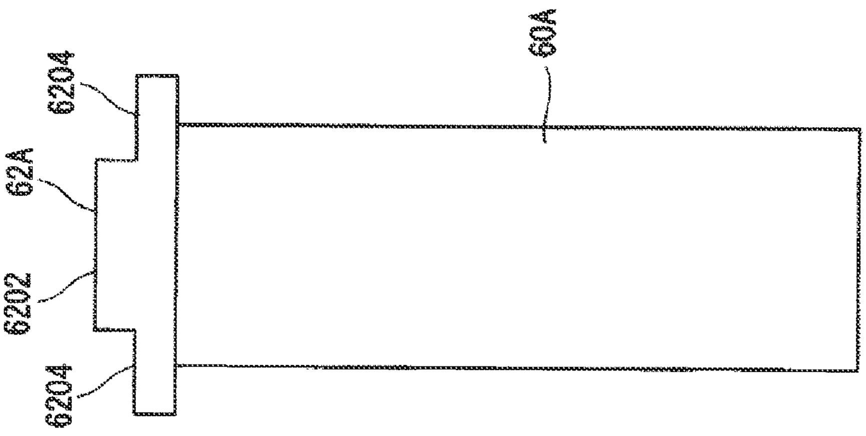
FIG. 12A is a front view of the first protection member section.
Figure 12B:
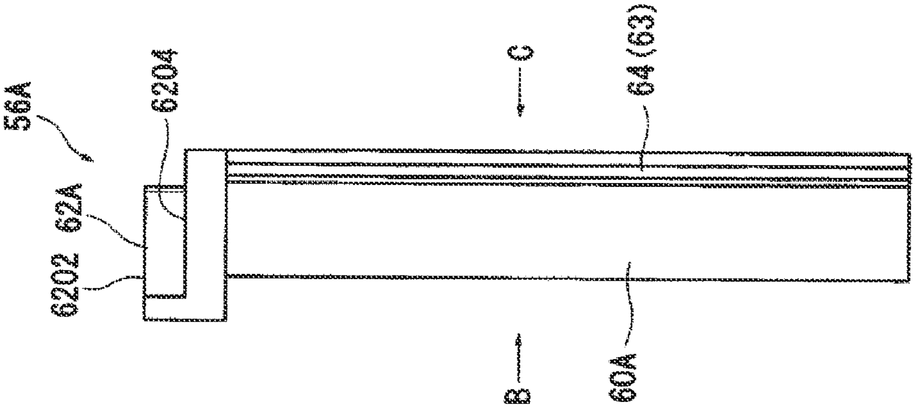
FIG. 12B is a view in the direction of an arrow B in FIG. 12A.
Figure 12C:
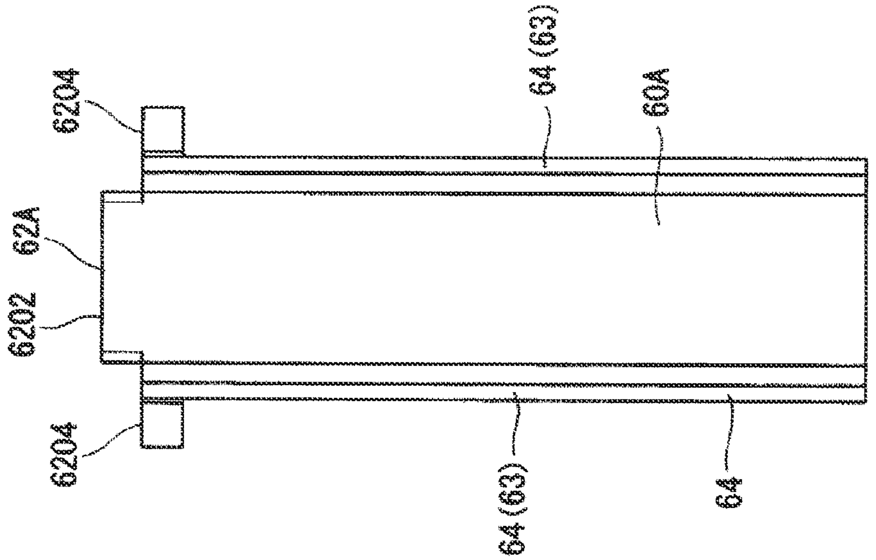
FIG. 12C is a view in the direction of an arrow C in FIG. 12A.

As illustrated in FIGS. 11A, 11B and 12B, the flange half-body portion 62A includes a central portion 6202 located at the center in the extension direction of the flange half-body portion 62A and a pair of side portions 6204 which is provided on both sides of the central portion 6202 and is thinner than the central portion 6202.

The locking grooves 64 are formed extending from the cylindrical half-body portion 60A to the pair of side portions 6204.

As illustrated in FIGS. 13A-13C and 14A-14C, the cylindrical half-body portion 60B of the second protection member section 56B is formed in an elongated shape having a semicircular arc cross-section, and the inner circumferential surface thereof constitutes a half portion of the cable insertion hole 58.

In the present embodiment, the locking projection 66 is provided on both sides of the cylindrical half-body portion 60B in the circumferential direction and extends over substantially the entire length of the cylindrical half-body portion 60B in the longitudinal direction.

As illustrated in FIG. 13C, the locking projection 66 includes a circumferential projection 6602 that can be locked with the circumferential groove 6402 and a radial projection 6604 that extends from an end portion of the circumferential projection 6602 toward an inner side in the radial direction of the cylindrical half-body portion 60B and can be locked with the radial groove 6404.

As illustrated in FIG. 13B, the shape of the flange half-body portion 62B of the second protection member section 56B includes a semi-annular plate-like portion 6210 and a pair of projection portions 6212 projecting from both sides of the semi-annular plate-like portion 6210 in the circumferential direction in a plan view, and an open portion 6214 is formed between the pair of projection portions 6212.

The inner circumferential surface of the flange half-body portion 62B is continuous with the inner circumferential surface of the cylindrical half-body portion 60B.

Figure 14C:
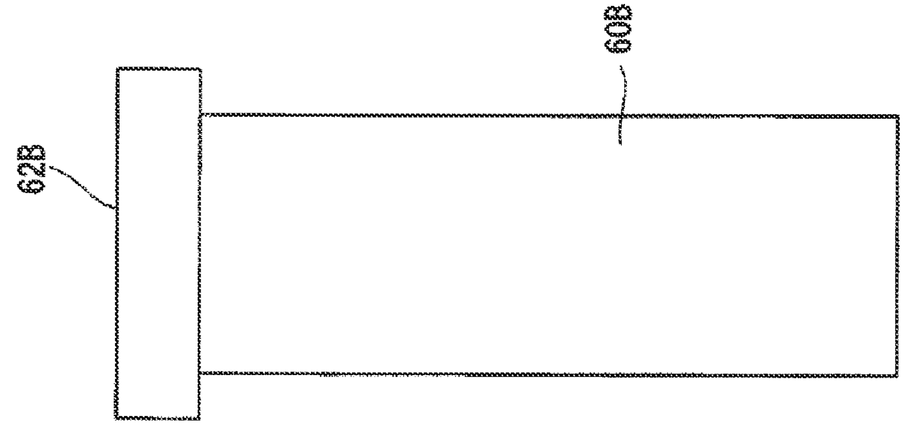
FIG. 14C is a view in the direction of an arrow C in FIG. 14A.
Figure 14B:
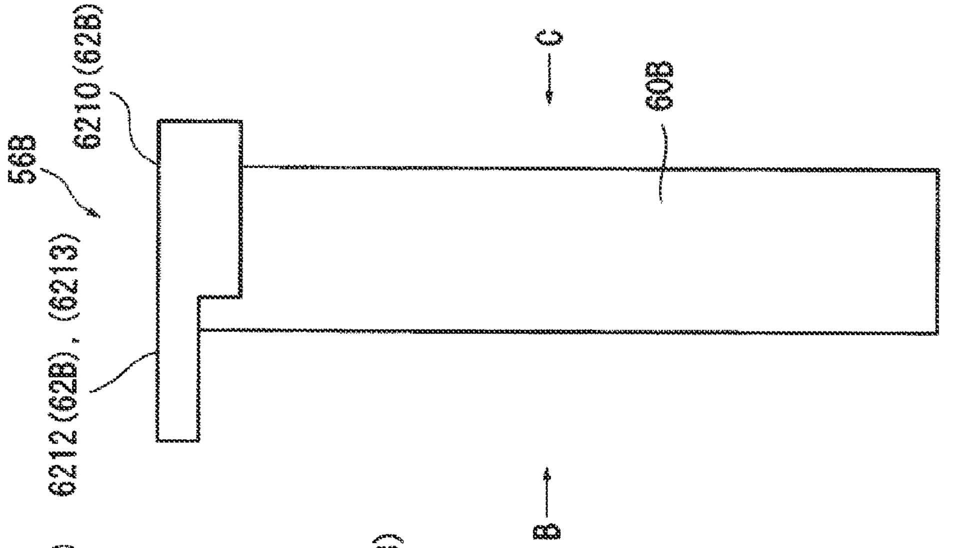
FIG. 14B is a view in the direction of an arrow B in FIG. 14A.
Figure 14A:
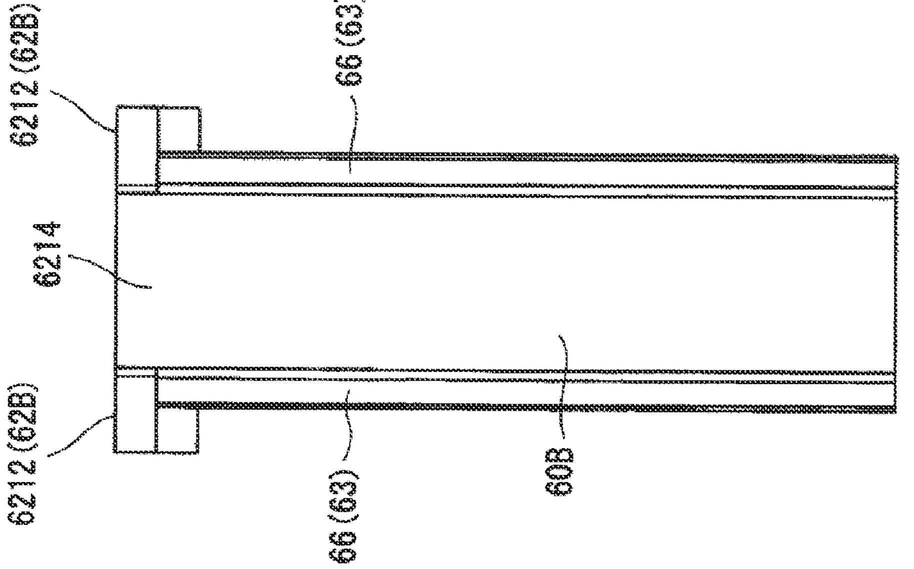
FIG. 14A is a front view of the second protection member section.

As illustrated in FIG. 14A, the pair of projection portions 6212 is formed to have a thickness thinner than the thickness of the semi-annular plate-like portion 6210.

As illustrated in FIG. 14B, the pair of locking projections 66 extends from the cylindrical half-body portion 60B to immediately below the pair of projection portions 6212.

Next, a method of using the cable protection member 56 will be described.

First, the cable 38 pulled out from the faucet 32 placed on the counter table 18 is covered with the cable protection member 56.

Figure 8C:
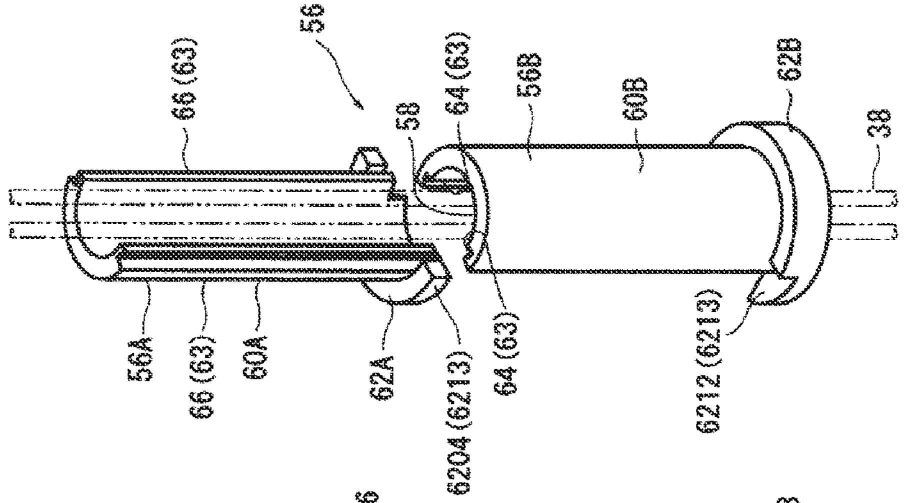
FIGS. 8A, 8B and 8C are explanatory diagrams illustrating a procedure for assembling the cable protection member according to the embodiment.
Figure 8B:
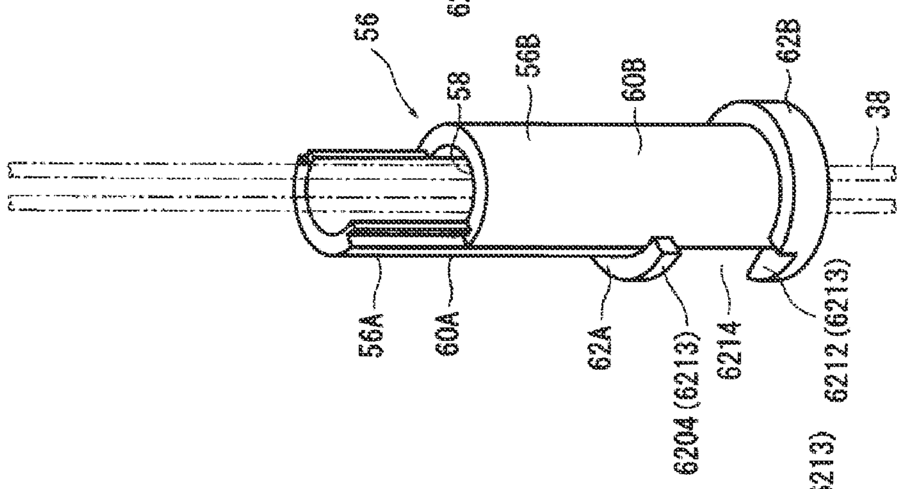
Figure 8A:
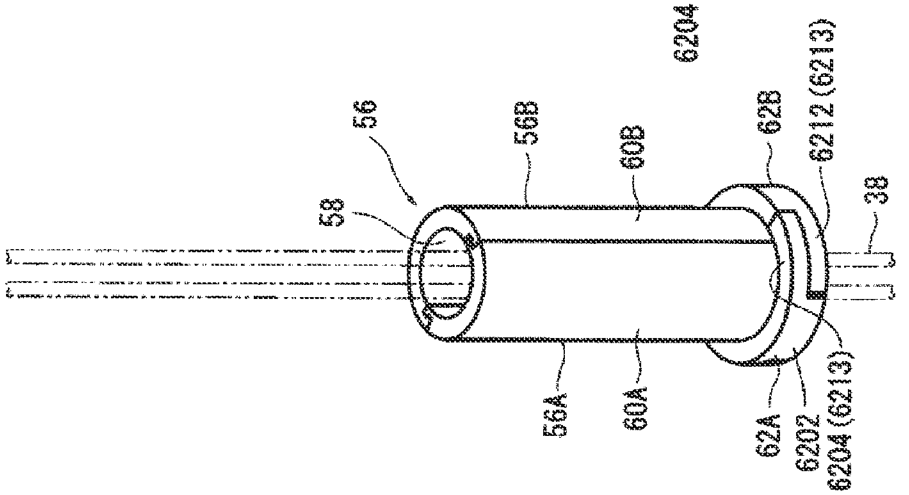

More specifically, as illustrated in FIG. 8A, the first protection member section 56A is positioned with the cable 38 positioned at the inner circumferential surface of the first protection member section 56A covering the half of the cable 38 in the radial direction, an end portion of the cylindrical half-body portion 60B located opposite to the flange half-body portion 62B of the second protection member section 56B is made to face an end portion of the flange half-body portion 62A of the first protection member section 56A, and the first and second protection member sections 56A and 56B are moved in directions approaching each other along the longitudinal direction of the first and second protection member sections 56A and 56B.

By this movement, the locking projections 66 are locked with the locking grooves 64 as illustrated in FIG. 8B, and the pair of side portions 6204 of the flange half-body portion 62A of the first protection member section 56A comes into contact with the pair of projection portions 6212 of the flange half-body portion 62B of the second protection member section 56B as illustrated in FIG. 8C.

In this state, the central portion 6202 of the flange half-body portion 62A of the first protection member section 56A is aligned with the open portion 6214 of the flange half-body portion 62B of the second protection member section 56B, the projection portions 6212 of the flange half-body portion 62B of the second protection member section 56B are aligned with the pair of side portions 6204 of the flange half-body portion 62A of the first protection 20 member section 56A, and the cable 38 is covered with the cable protection member 56.

That is, the cable 38 is covered with the cylindrical half-body portions 60A and 60B and the flange half-body portions 62A and 62B of the pair of protection member sections 56A and 56B, whereby a state in which the cable 38 is inserted through the cable insertion hole 58 of the cable protection member 56 is achieved.

In this state, when the first and second protection member sections 56A and 56B are moved in directions away from each other along the longitudinal direction of the first and second protection member sections 56A and 56B to separate the end portion of the flange half-body portion 62A of the first protection member section 56A from the end portion of the cylindrical half-body portion 60B located opposite to the flange half-body portion 62B of the second protection member section 56B, the first and second protection member sections 56A and 56B can be divided in the diameter direction of the cable insertion hole 58.

Figures 10A, 10B, 10C:
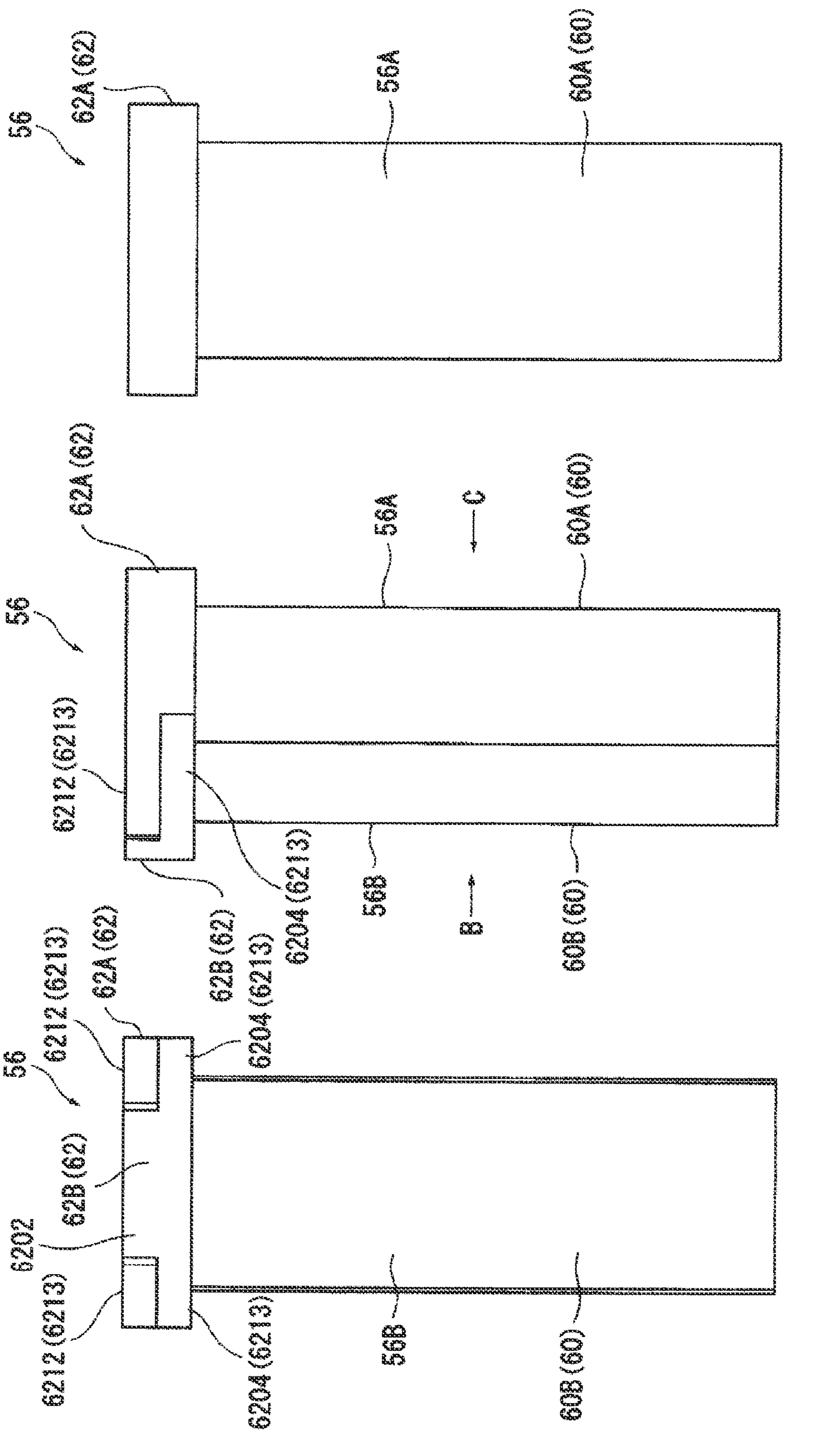

In this state, the upper surface of the first protection member section 56A and the upper surface of the second protection member section 56B are located on the same plane, and the lower surface of the first protection member section 56A and the lower surface of the second protection member section 56B are located on the same plane as illustrated in FIGS. 10A-10C.

The first protection member section 56A and the second protection member section 56B are immovably coupled to each other in the diameter direction of the cable insertion hole 58 by the locking grooves 64 and the locking projections 66 constituting the diameter-direction coupling portions 63, more specifically, by locking between the circumferential grooves 6402 and the circumferential projections 6602 and locking between the radial grooves 6404 and the radial projections 6604.

As illustrated in FIGS. 8C, 10A and 10B, the movement of the first protection member section 56A toward the flange half-body portion 62B is restricted by the pair of side portions 6204 of the first protection member section 56A being in contact with the pair of projection portions 6212 of the second protection member section 56B.

Thus, the pair of side portions 6204 and the pair of projection portions 6212 constitute first longitudinal coupling portions 6213 which are immovably coupled to each other in one of both longitudinal directions of the protection member sections 56A and 56B with the pair of protection member sections 56A and 56B coupled to each other.

Next, as illustrated in FIGS. 2 and 3, with the cable 38 inserted through the cable protection member 56, the base plate portion 40 of the faucet 32 is moved downward from above the through-hole 30 of the counter table 18 such that the base plate portion 40 is positioned on the upper surface 1802 of the counter table 18 while the rod 48 and the cable 38 are inserted through the through-hole 30.

Figure 6B:
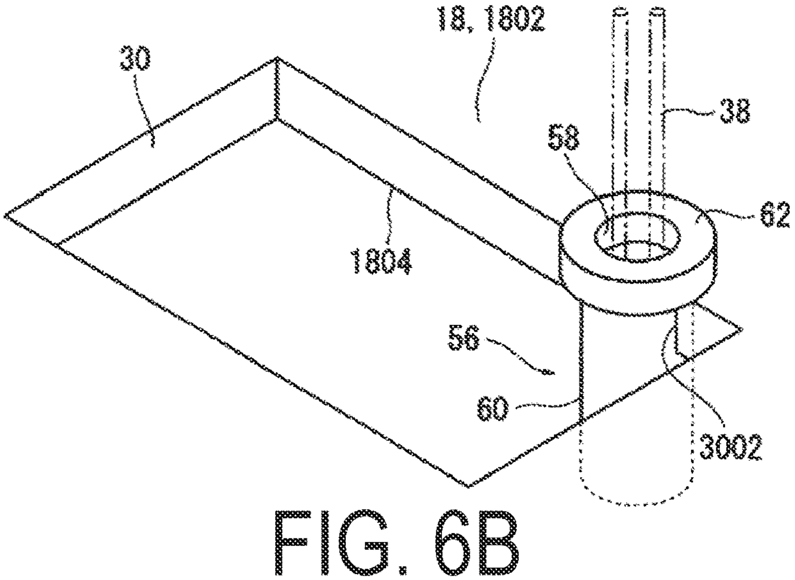
Figure 6C:
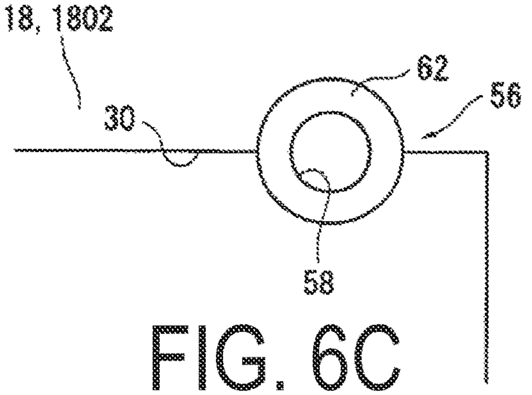
Figure 7:
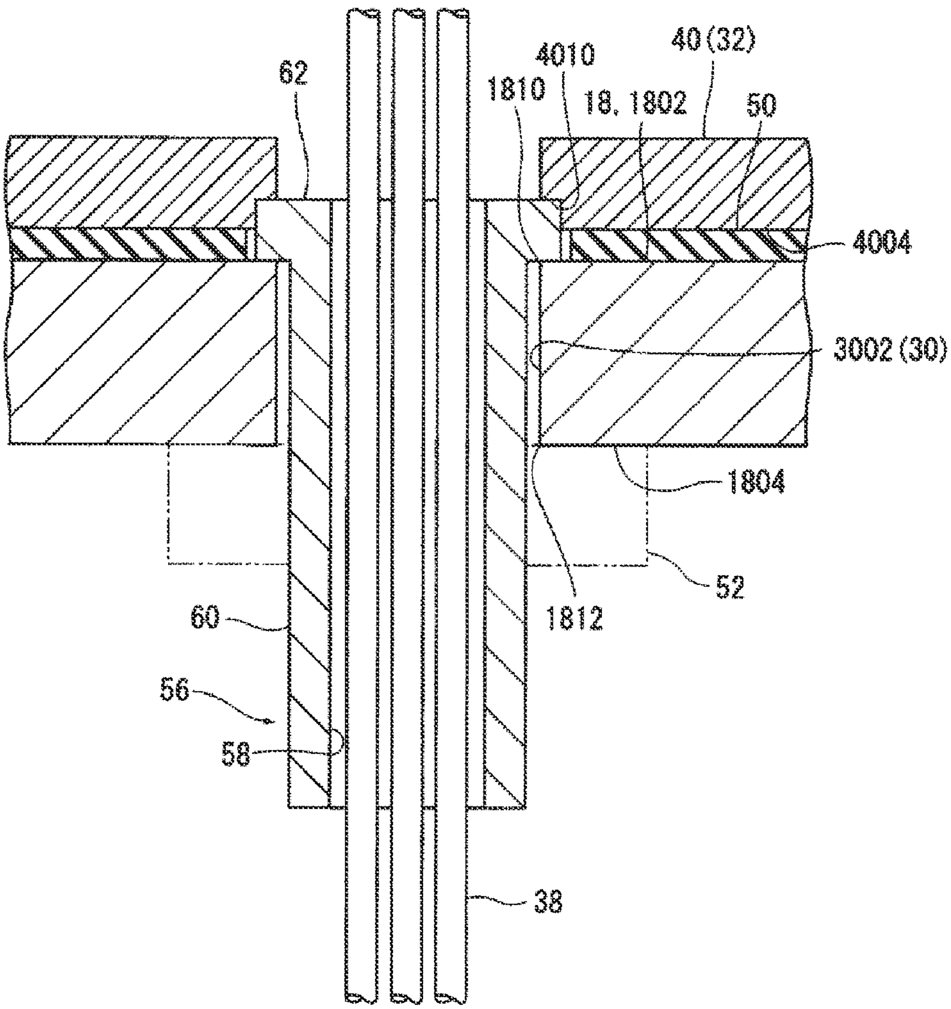
FIG. 7 is a cross-sectional view illustrating a state in which the cable protection member according to the embodiment is installed at the notch portion of the counter table.

At this time, as illustrated in FIG. 6B, the cylindrical portion 60 of the cable protection member 56 is inserted into the notch portion 3002 of the through-hole 30, the flange portion 62 is positioned on the upper surface 1802 of the counter table 18 around the notch portion 3002, and as illustrated in FIG. 7, the flange portion 62 is pressed against the upper surface 1802 of the counter table 18 by the lower surface 4004 of the base plate portion 40 of the faucet 32.

As illustrated in FIG. 7, in the present embodiment, a recess portion 4010 having a shape matching the outer shape of the flange portion 62 is formed in the lower surface 4004 of the base plate portion 40, and the flange portion 62 is pressed against the upper surface 1802 of the counter table 18 via the packing 50 by the recess portion 4010 with the flange portion 62 accommodated in the recess portion 4010.

With the cable protection member 56 attached to the counter table 18 as described above, the cylindrical portion 60 of the cable protection member 56 extends from the inside of the through-hole 30 to below the lower surface 1804 of the counter table 18.

In this state, as illustrated in FIG. 3, by screwing the nut N onto the male thread 4802 of the rod 48 to tighten the clamp fitting 52 with the nut N, the counter table 18 is sandwiched between the base plate portion 40 and the clamp fitting 52 with interposition of the packing 50, whereby the faucet 32 is attached to the upper surface 1802 of the counter table 18.

As a result, the flange portion 62 is pressed against the upper surface 1802 of the counter table 18 by the faucet 32, whereby the cable protection member 56 is attached to the counter table 18.

According to the present embodiment, the cable protection member 56 includes the cable insertion hole 58 through which the cable 38 is inserted and the pair of protection member sections 56A and 56B which can be divided in the diameter direction of the cable insertion hole 58, and the pair of protection member sections 56A and 56B includes the diameter-direction coupling portions 63 to be immovably coupled in a direction away from each other in the diameter direction of the cable insertion hole 58 and forms therein the cable insertion hole 58 with the pair of protection member sections 56A and 56B coupled via the diameter-direction coupling portions 63.

Thus, even with the connector 54 having an outer diameter larger than the inner diameter of the cable insertion hole 58 attached to an end portion of the cable 38, without detaching the connector 54 from the cable 38, the cable 38 can be inserted through the cable insertion hole 58 and covered with the cable protection member 56 by coupling the pair of protection member sections 56A and 56B with the cable 38 sandwiched therebetween with the diameter-direction coupling portions 63.

This allows the cable 38 to be easily and reliably covered and protected by the cable protection member 56 and is advantageous in improving efficiency of protection work of the cable 38.

In the aircraft lavatory unit 10, even when severe vibration occurs in a fuselage because an aircraft enters an air pocket during flight and the cable 38 is about to come into contact with the edges 1810 and 1812 of the counter table 18 due to this vibration, the portion of the cable 38 near the edges 1810 and 1812 is covered with the cylindrical portion 60 of the cable protection member 56, and thus damage to the cable 38 is prevented, which is advantageous in simplifying maintenance work.

In the present embodiment, the cable protection member 56 includes the cylindrical portion 60 having a uniform outer diameter and including the cable insertion hole 58, and the pair of protection member sections 56A and 56B includes the cylindrical half-body portions 60A and 60B which include the diameter-direction coupling portions 63 and form the cylindrical portion 60 in a state of being coupled to each other.

Thus, even when the cable 38 is inserted into the through-hole 30 of a wall portion including the counter table 18, the cable 38 can be disposed in the through-hole 30 with the cable 38 inserted through the cylindrical portion 60, which is advantageous in protecting the cable 38 from the edges 1810 and 1812 of the wall portion.

Since the diameter-direction coupling portions 63 extend over substantially the entire length of the cylindrical portion 60, the diameter-direction coupling portions 63 are unlikely to come off in the diameter direction of the cable insertion hole 58, which is advantageous in reliably covering and protecting the cable 38.

In this case, the flange portion 62 may be omitted and, for example, bundling bands 68 may be used as a movement blocking member that blocks the movement of the cable protection member 56 along the cable 38 as illustrated in FIG. 15.

That is, the bundling band 68 may be fastened to portions of the cable 38 projecting from both ends of the cylindrical portion 60 in the longitudinal direction to prevent the cylindrical portion 60 (the cable protection member 56) from moving along the longitudinal direction of the cable 38.

In the present embodiment, a case in which the cable insertion hole 58 is formed to have an inner diameter larger than the outer diameter of the cable 38 has been described. However, the cable insertion hole 58 may be formed to have an inner diameter that can prevent the movement of the cable 38. When the cable protection member 56 is attached to the cable 38 in this manner, it is advantageous in omitting a movement prevention member such as the bundling bands 68.

In the present embodiment, the diameter-direction coupling portion 63 includes the locking groove 64 provided at the cylindrical half-body portion 60A of one of the pair of protection member sections 56A and 56B and the locking projection 66 which is provided at the cylindrical half-body portion 60B of the other protection member section 56B of the pair of protection member sections 56A and 56B and can be locked with the locking groove 64, which is advantageous in easily forming the diameter-direction coupling portion 63.

In the present embodiment, the locking groove 64 includes the circumferential groove 6402 extending in the circumferential direction of the cylindrical half-body portion 60A and the radial groove 6404 extending from the end portion of the circumferential groove 6402 toward the inner side in the radial direction of the cylindrical half-body portion 60A, and the locking projection 66 includes the circumferential projection 6602 that can be locked with the circumferential groove 6402 and the radial projection 6604 that can be locked with the radial groove 6404. Thus, it is advantageous in reliably and immovably coupling the protection member sections 56A and 56B in the diameter direction of the cable insertion hole 58 with the cable protection member 56 attached to the cable 38.

In the present embodiment, the cable protection member 56 includes the flange portion 62 which is provided at the end portion of the cylindrical portion 60 in the longitudinal direction and has an outer diameter larger than the outer diameter of the cylindrical portion 60 and through which the cable insertion hole 58 extends, and the pair of protection member sections 56A and 56B includes the flange half-body portions 62A and 62B which are provided at the end portions of the cylindrical half-body portions 60A and 60B in the longitudinal direction and form the flange portion 62 in a state of being coupled to each other.

The flange portion 62 may be omitted, but in the case of providing the flange portion 62, attaching the flange portion 62 to an upper surface of a wall portion such as the counter table 18 is advantageous in easily disposing the cable protection member 56.

In the present embodiment, the flange half-body portions 62A and 62B of the pair of protection member sections 56A and 56B are provided with the first longitudinal coupling portions 6213 which are immovably coupled to each other in one direction of both directions of the longitudinal direction of the protection member sections 56A and 56B with the pair of protection member sections 56A and 56B coupled to each other.

Thus, in covering the cable 38 with the cable protection member 56, it is possible to prevent the pair of protection member sections 56A and 56B from moving along one of both directions in the longitudinal direction of the protection member sections 56A and 56B, which is advantageous in easily assembling the pair of protection member sections 56A and 56B.

Modified Example 1

Next, Modified Example 1 of the present embodiment will be described with reference to FIGS. 16A-16B and 17A-17B.

In the following description of modified examples, the same sections and members as those in the first embodiment will be denoted by the same reference signs, descriptions thereof will be omitted, and different sections will be mainly described.

In Modified Example 1, the pair of protection member sections 56A and 56B includes second longitudinal coupling portions 6260 which are immovably coupled to each other in both directions of the longitudinal direction of the protection member sections 56A and 56B in a state of being coupled to each other, and the second longitudinal coupling portions 6260 are provided at the flange half-body portions 62A and 62B.

Figure 16A:
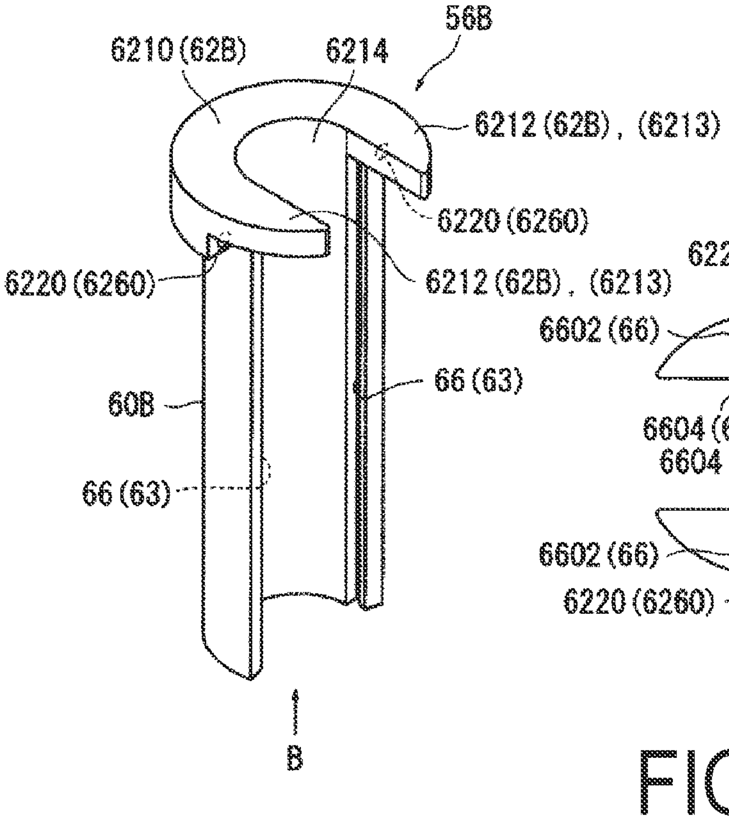
FIG. 16A is a perspective view of a second protection member section in Modified Example 1.
Figure 16B:
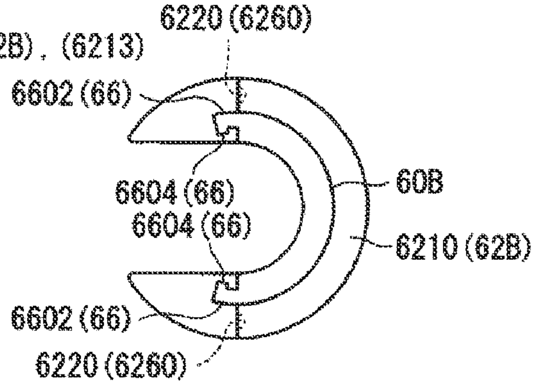
FIG. 16B is a view in the direction of an arrow B in FIG. 16A.
Figure 17A:
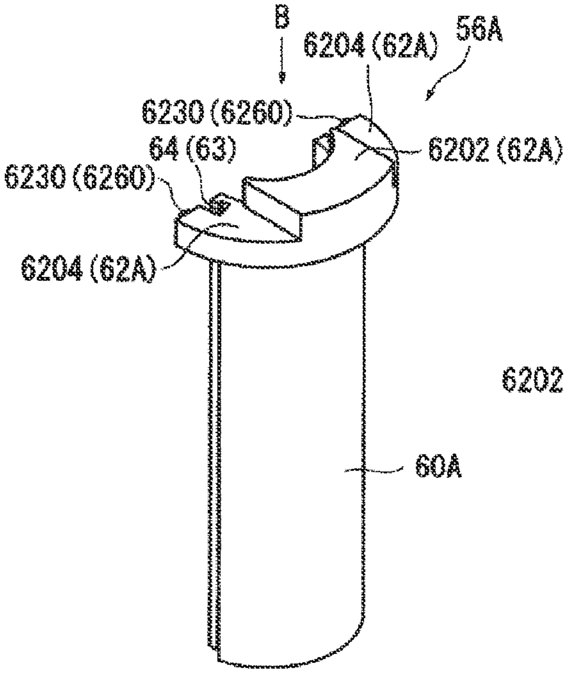
FIG. 17A is a perspective view of a first protection member section according to Modified Example 1.
Figure 17B:
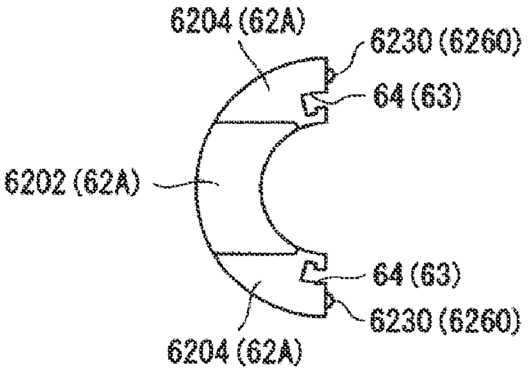
FIG. 17B is a view in the direction of an arrow B in in FIG. 17A.

That is, locking recess portions 6220 are provided on end surfaces of both ends of the semi-annular plate-like portion 6210 of the flange half-body portion 62B of the second protection member section 56B as illustrated in FIGS. 16A-16B, locking projections 6230 which can be locked with the locking recess portions 6220 are provided at end surfaces of the pair of side portions 6204 of the flange half-body portion 62A of the first protection member section 56A as illustrated in FIGS. 17A-17B, and the locking recess portions 6220 and the locking projections 6230 constitute the second longitudinal coupling portions 6260.

Accordingly, the first protection member section 56A is positioned with the cable 38 positioned at the inner circumferential surface of the first protection member section 56A so as to cover the half of the cable 38 in the radial direction, an end portion of the cylindrical half-body portion 60B located opposite to the flange half-body portion 62B of the second protection member section 56B is made to face an end portion of the flange half-body portion 62A of the first protection member section 56A, the first and second protection member sections 56A and 56B are moved in directions approaching each other along the longitudinal direction of the first and second protection member sections 56A and 56B, whereby the central portion 6202 of the flange half-body portion 62A of the first protection member section 56A is aligned with the open portion 6214 of the flange half-body portion 62B of the second protection member section 56B.

Then, the projection portions 6212 of the flange half-body portion 62B of the second protection member section 56B are aligned with the pair of side portions 6204 of the flange half-body portion 62A of the first protection member section 56A, and at the same time, the locking projections 6230 are locked with the locking recess portions 6220, whereby the first protection member section 56A and the second protection member section 56B are coupled to each other.

This allows the pair of protection member sections 56A and 56B to be immovably coupled to each other in both directions of the longitudinal direction of the protection member sections 56A and 56B with the cable 38 covered with the cable protection member 56.

Thus, in covering the cable 38 with the cable protection member 56, it is possible to prevent the pair of protection member sections 56A and 56B from moving along the longitudinal direction of the protection member sections 56A and 56B, which is advantageous in easily assembling the pair of protection member sections 56A and 56B.

Modified Example 2

Next, Modified Example 2 of the present embodiment will be described with reference to FIGS. 18A-18B and 19A-19B.

In Modified Example 2, the pair of protection member sections 56A and 56B includes the second longitudinal coupling portions 6260 which are immovably coupled to each other in both directions of the longitudinal direction of the protection member sections 56A and 56B in a state of being coupled to each other, and the second longitudinal coupling portions 6260 are provided at the cylindrical half-body portions 60A and 60B.

Figure 18A:
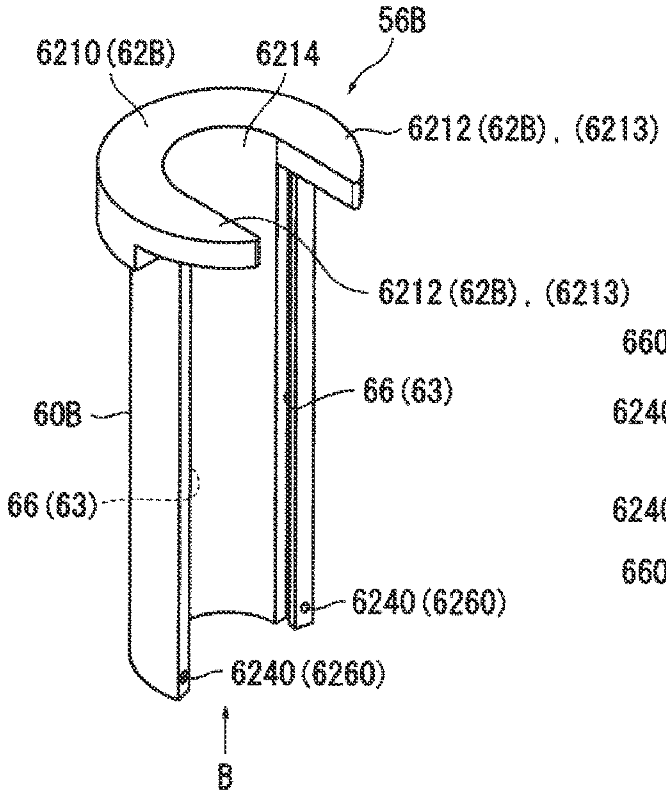
FIG. 18A is a perspective view of a second protection member section according to Modified Example 2.
Figure 18B:
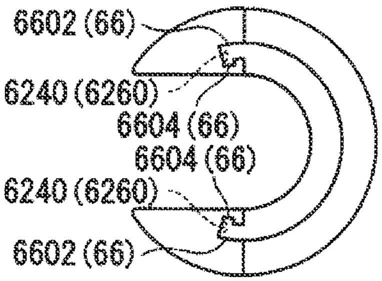
FIG. 18B is a view in the direction of an arrow B in FIG. 18A.
Figure 19A:
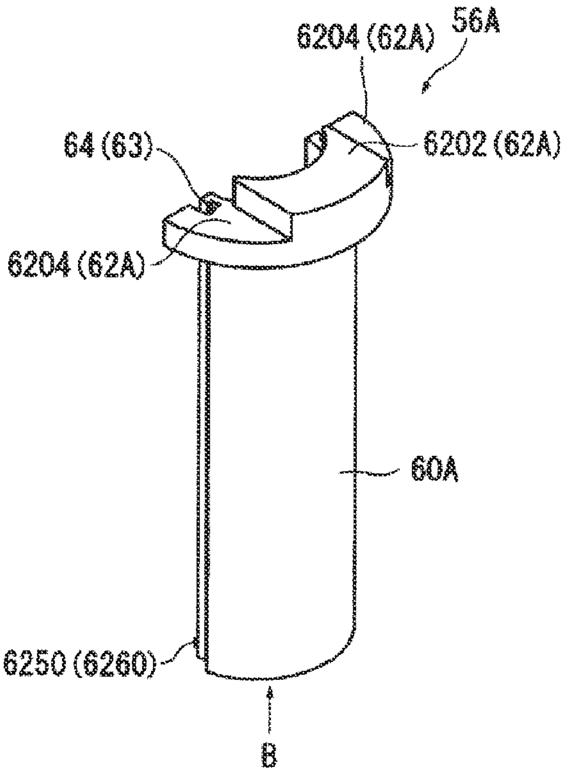
FIG. 19A is a perspective view of a first protection member section according to Modified Example 2.
Figure 19B:
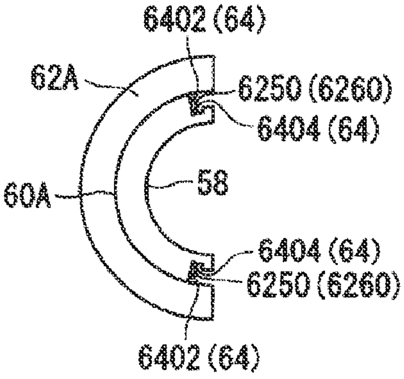
FIG. 19B is a view in the direction of an arrow B in FIG. 19A.

That is, as illustrated in FIGS. 18A-18B, locking recess portions 6240 are provided at places on end surfaces of the locking projections 66 (the circumferential projections 6602) on both sides in the circumferential direction of the cylindrical half-body portion 60B of the second protection member section 56B, the places being located an opposite side of the flange half-body portion 62B. As illustrated in FIGS. 19A-19B, locking projections 6250 which can be locked with the locking recess portions 6240 are provided at sections on bottom surfaces of the locking grooves 64 (the circumferential grooves 6402) on both sides in the circumferential direction of the cylindrical half-body portion 60A of the first protection member section 56A, the places being located on an opposite side of the flange half-body portion 62A. The locking recess portions 6240 and the locking projections 6250 constitute the second longitudinal coupling portions 6260.

Accordingly, the first protection member section 56A is positioned with the cable 38 positioned at the inner circumferential surface of the first protection member section 56A so as to cover the half of the cable 38 in the radial direction, an end portion of the cylindrical half-body portion 60B located opposite to the flange half-body portion 62B of the second protection member section 56B is made to face an end portion of the flange half-body portion 62A of the first protection member section 56A, the first and second protection member sections 56A and 56B are moved in directions approaching each other, whereby the central portion 6202 of the flange half-body portion 62A of the first protection member section 56A is aligned with the open portion 6214 of the flange half-body portion 62B of the second protection member section 56B.

Then, the projection portions 6212 of the flange half-body portion 62B of the second protection member section 56B are aligned with the pair of side portions 6204 of the flange half-body portion 62A of the first protection member section 56A, and at the same time, the locking projections 6250 are locked with the locking recess portions 6240, whereby the first protection member section 56A and the second protection member section 56B are completely coupled to each other.

This allows the pair of protection member sections 56A and 56B to be immovably coupled to each other in both directions of the longitudinal direction of the protection member sections 56A and 56B with the cable 38 covered with the cable protection member 56.

Thus, in covering the cable 38 with the cable protection member 56, it is possible to prevent the pair of protection member sections 56A and 56B from moving along the longitudinal direction of the protection member sections 56A and 56B, which is advantageous in easily assembling the pair of protection member sections 56A and 56B.

The second longitudinal coupling portions 6260 of Modified Example 2 can be also applied to the cable protection member 56 from which the flange portion 62 is omitted.

The invention claimed is:

1. A cable protection member for protecting a cable, the cable protection member comprising:

a cable insertion hole through which the cable is inserted; and a pair of protection member sections divisible in a diameter direction of the cable insertion hole;

the pair of protection member sections comprising diameter-direction coupling portions to be immovably coupled in a direction away from each other in the diameter direction of the cable insertion hole through movement of the protection member sections relative to one another in a longitudinal direction of the protection member sections, and the cable insertion hole being formed inside the pair of protection member sections that are being coupled via the diameter-direction coupling portions.

2. The cable protection member according to claim 1, comprising a cylindrical portion comprising the cable insertion hole, wherein the pair of protection member sections each comprise a cylindrical half-body portion that is formed in an elongated shape having a semicircular arc cross-section and constitutes the cylindrical portion with the pair of protection member sections coupled to each other, and the diameter-direction coupling portions extend along a longitudinal direction of the cylindrical half-body portion on both sides of the cylindrical half-body portion in a circumferential direction.

3. The cable protection member according to claim 2, wherein the diameter-direction coupling portions comprise a locking groove provided at one cylindrical half-body portion of the pair of protection member sections and a locking projection which is provided at the cylindrical half-body portion of an other protection section of the pair of protection member sections and can be locked with the locking groove.

4. The cable protection member according to claim 3, wherein the locking groove comprises a circumferential groove extending in the circumferential direction of the cylindrical half-body portion and a radial groove extending from an end portion of the circumferential groove to an inner side in a radial direction of the cylindrical half-body portion, and the locking projection comprises a circumferential projection which can be locked with the circumferential groove and a radial projection which can be locked with the radial groove.

5. The cable protection member according to claim 2, comprising a flange portion provided at an end portion of the cylindrical portion in a longitudinal direction and having an outer diameter larger than an outer diameter of the cylindrical portion, the cable insertion hole extending through the flange, wherein the pair of protection member sections each comprise a flange half-body portion which is provided at an end portion of the cylindrical half-body portion in the longitudinal direction, have an inner circumferential surface continuous with an inner circumferential surface of the cylindrical half-body portion, and constitute the flange portion with the pair of protection member sections coupled to each other.

6. The cable protection member according to claim 1, wherein the pair of protection member sections each comprise a second longitudinal coupling portion to be immovably coupled to each other in both directions of a longitudinal direction of the protection member sections that are being coupled to each other.

* * * * *